April 30, 1963   E. J. HAYES   3,087,982
VACUUM TUBE MOUNTS
Filed Dec. 1, 1959   2 Sheets-Sheet 1
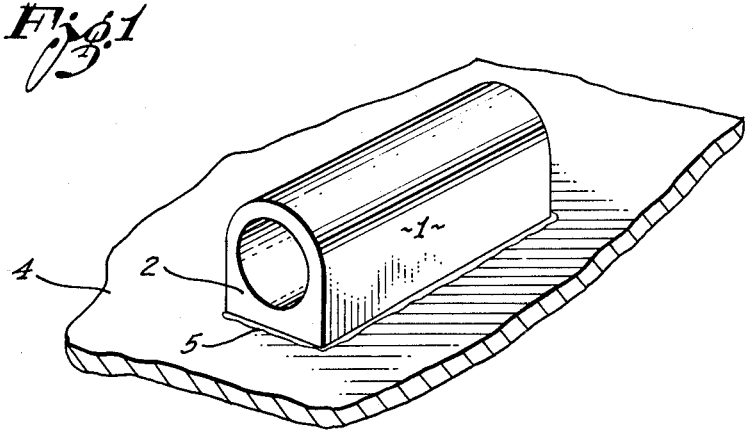
Fig.1
Fig.2
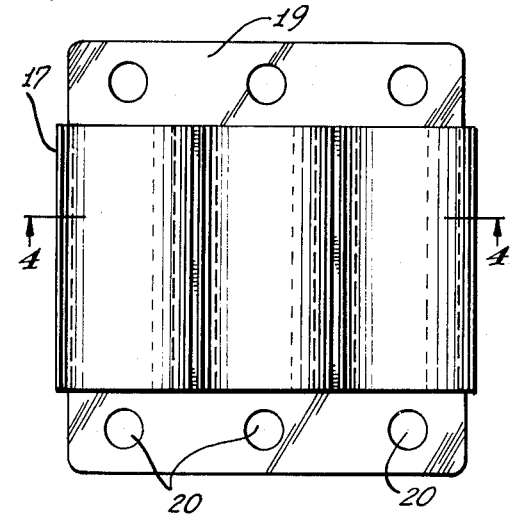
Fig.3
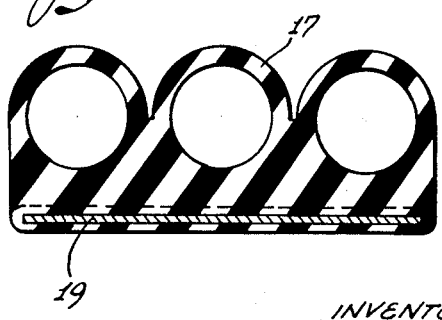
Fig.4
INVENTOR:
Eddie J. Hayes
By Willard M. Graham
Agent April 30, 1963
E. J. HAYES
3,087,982
VACUUM TUBE MOUNTS
Filed Dec. 1, 1959
2 Sheets-Sheet 2
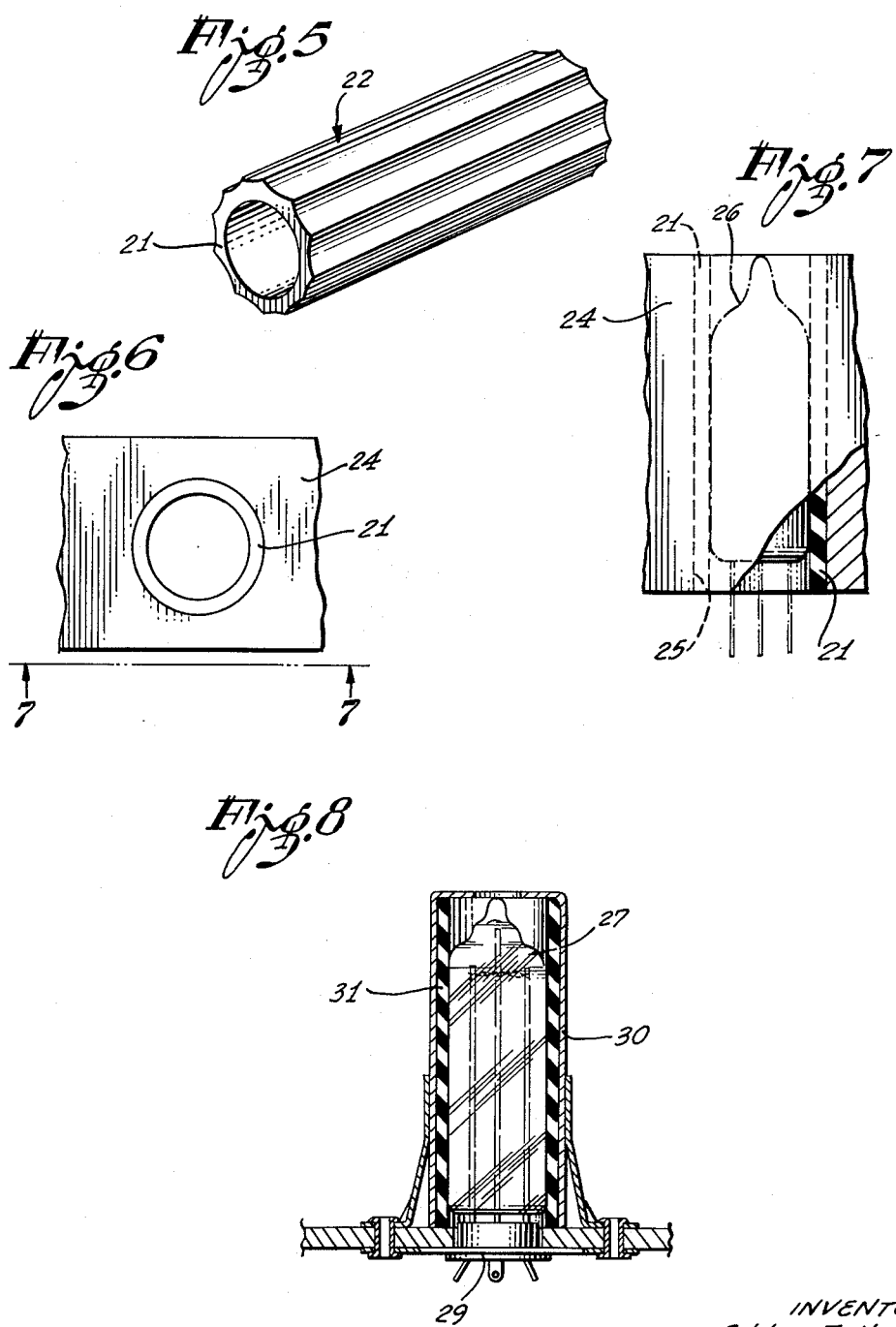
INVENTOR:
Eddie J. Hayes
By Willard M. Graham
Agent.

United States Patent Office 3,087,982
Patented Apr. 30, 1963

3,087,982
VACUUM TUBE MOUNTS
Eddie James Hayes, Reseda, Calif., assignor to Northrop Corporation, Beverly Hills, Calif., a corporation of California
Filed Dec. 1, 1959, Ser. No. 856,578
6 Claims. (Cl. 174—52)

This invention relates to vacuum tube mounts, and more particularly, to vacuum tube mounting and holding devices having means in contact with the glass tube for heating transfer and anti-vibration purposes.

Along with miniaturized electronic components and sealed plug-in module devices has come the problem of conducting heat away from such equipment so that it will continue to operate. Various heat sink devices and cooling air flow systems have been adopted with some degree of success. However, in the case of glass vacuum tubes, even in a cooling flow of air, the downstream side of the tubes have cracked and failed due to excessive heat.

One present practice is to mount the sub-miniature tubes which use no sockets, in a close-fitting bore in a solid metal holder. The metal is intended to absorb heat from the tube envelope and conduct it away to a larger heat exchanging means. Even this method has not been successful in reducing tube failures due to heat, because the glass tube envelopes are slightly irregular and do not contact the bore ball equally over the entire substantially cylindrical surface of the tube. Therefore, hot spots develop and the tube will break. Also, it is obvious that this method in itself does not provide any degree of shock and vibration resistance.

An object of the present invention is to provide a tube holder which will contact the entire wall of the tube, which will conduct heat away from the tube, and thus prevent hot spots from occurring.

Another object of this invention is to provide a tube mount which acts as a cushion to protect the tube against breakage from vibration and shock acting on the equipment in which the tube is installed.

Further objects are to provide a tube holder or mount which is extremely simple and economical, is reliable and easily adapted to the function desired.

Briefly, my invention comprises a suitably shaped piece of heat conductive elastic material having a cylindrical bore to fit around the glass tube and hold it in elastic contact therewith. Silicone rubber is the preferred material for the holder. The silicone rubber holder may be a simple tubular sleeve designed to be mounted in turn in additional tube mounting means, or it may be formed to attach directly to the equipment chassis or other framework.

My invention will be further understood from the detailed description to follow, and from the accompanying drawings illustrating various particular embodiments thereof.

In the drawings,

FIGURE 1 is a perspective view of a silicone rubber tube holder showing its attachment directly to a metal supporting surface.

FIGURE 2 is a perspective view of another embodiment of a silicone rubber tube holder, combined with a thin metal strip for attachment purposes, showing a tube in place as installed.

FIGURES 3 and 4 are top and across section views, respectively, of a multiple tube holder similar to the one in FIGURE 2, the view in FIGURE 4 being taken as indicated by the line 4—4 in FIGURE 3.

FIGURE 5 is a perspective view of another form of silicone rubber tube holder.

FIGURES 6 and 7 are plan and elevation views, respectively, of a silicone rubber tube sleeve mounted in a solid metal part.

FIGURE 8 is a longitudinal section view of a silicone rubber tube sleeve incorporated in a more conventional type of tube shield.

Referring first to FIGURE 1 for a detailed description of specific apparatus, a tube mount 1 comprises a generally cylindrical hollow holder with two straight sides extended transversely to form a relatively thick base 2 with a flat bottom surface running the entire length of the tube mount 1. This mount is molded or extruded of silicone rubber, preferably any general purpose compound of this type. Due to the known good thermal conductivity and excellent dielectric properties of this material, it serves admirably to carry heat away from an electronic tube when made as described herein. However, I do not desire to limit the present invention to silicone rubber alone, since other materials of elastic and heat conductive properties may be found.

Silicone rubber is a semi-organic material and is composed of, for example, a dimethylsiloxane polymer and suitable fillers. It can be obtained, for example, under the trade name Silastic, manufactured by Dow Corning Corporation, Midland, Michigan, and for tube mounting purposes it preferably has a Shore hardness in the range of approximately 45 to 60.

The wall thickness of mount 1 is preferably about .086 inch, for example, the inner diameter of the mount being about .072 inch ($\pm\frac{1}{32}$) less than the outer diameter of the tube. Thus, the mount is stretched outwardly an amount to grip the tube and to insure contact at all spots between the amount and the cylindrical periphery of the tube, yet the tube is easily removable by hand from the mount 1. The various dimensions and specifications given herein may vary by a considerable relative amount and still give satisfactory results.

Returning to FIGURE 1, the tube mount 1 can be bonded directly to a metal surface 4 by means of a suitable rubber-to-metal adhesive 5. Bonding of rubber and metal is uniform over the entire surface of the mount, thus providing an excellent heat sink. The tube (not shown in FIGURE 1) is merely inserted and centered in the mount 1, the electrical leads connected as desired and the installation is complete.

In FIGURE 2 is shown a similar tube mount 6, but having provisions for attachment screws 7. In this embodiment, the silicone rubber is extruded with an aluminum, or other metal, strip 9 contained in a base portion 10. After extruding and cutting to overall length, each end of the rubber tubing is sliced off down to the metal strip 9 and pulled off. Screw holes (not visible under the screw heads) in the strip 9 will provide attachment means to a chassis 12 in case this type of mounting is desired, although the embodiment of FIGURE 1 is considered satisfactory and has the advantage of lower cost. As shown in FIGURE 2, a miniature or sub-miniature tube 14 is installed in the mount 6, and its lead wires 15 are soldered to terminals 16 which may be secured to the chassis 12, for example, or to other components (not shown).

FIGURES 3 and 4 illustrate how a multiple tube mount 17 can be extruded, which uses the same type of mounting as shown in FIGURE 2, for example. In this case, a single wide metal strip 19 is preferably used, with plural attachment screw holes 20. Of course, other types of tube mount construction can also be extruded or molded in a similar manner for multiple parallel installations.

In FIGURE 5 is shown another type of silicone rubber tubing shape which is useful in electron tube mounting. Here, a tube mount 21 has a fluted outer surface 22.

This construction is especially advantageous for shock absorbing purposes when installed within a substantially rigid enclosing member.

FIGURES 6 and 7 show the type of solid tube mounting in which the mount 21 of FIGURE 5 may be used. This is typical of all installations where a solid metal block 24 is used. A bore 25 in the block 24 is made large enough to contain the silicone rubber tube mount 21. When in place, with a tube 26 installed, the fluted outer periphery of the mount 21 is squeezed inwardly and laterally so that it substantially fills the bore 25 around its entire circumference. Thus, the tube will be adequately shock mouned by the rubber as well as having the heat drawn off uniformly so that hot spots are eliminated.

Even if the more ordinary styles of tube installation are desired, the present invention is applicable. FIGURE 8 shows a tube 27 inserted in a conventional tube socket 29, and a metal tube shield 30 employed. A silicone rubber mounting sleeve 31 is provided on the inner side of the shield 30 to envelop the tube 27, following the same relative dimensions and teaching as described hereinbefore. If forced air ventilation is applied to this construction, the combination of the metal and silicone rubber provides an even temperature and eliminates hot spots which crack many tubes in conventional metal mounts.

Thus it is seen that the present invention provides a low cost means of holding vacuum tubes which prevents tube failures due to excessive heat and vibration conditions. The silicone rubber, when compressed by insertion of a tube in the holder, follows the contour of the tube tightly, and prevents the aforesaid failures such as are encountered with the use of metal tube holders.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. An electronic tube mount comprising an electronic tube having a glass envelope; a generally tubular shaped sleeve of elastic and heat conductive material removably slipped around said tube for substantially the full length thereof; said sleeve having a continuous, closed, plain, bore with a normal diameter slightly less than the outside diameter of said tube; said sleeve being open at both ends; said sleeve having an exterior plane surface parallel to the bore axis thereof, the width of said plane surface being substantially equal to the maximum outside diameter of said sleeve at said bore, whereby said mount can be bonded to a flat supporting structure.

2. An electron tube mount comprising an electron tube, an elastic, heat conductive tubular structure having a continuous closed bore slightly less in normal diameter than said tube and slidably mounted thereon, a relatively thick base portion on said tubular structure having a flat mounting surface parallel to the axis of said bore, and a rigid mounting strip contained within said base between said surface and said bore, said strip extending beyond an end of said elastic tubular structure and having mounting means near the end of said strip beyond said bore adapted to cooperate with attachment means to an external support.

3. Apparatus in accordance with claim 2 including a series of integrally connected parallel adjacent bores for holding a plurality of tubes, wherein a single rigid mounting strip extends substantially the full width of the resulting assembly.

4. A tube mount structure comprising a relatively large solid block of metal, a bore in said block, an independent sleeve of cured silicone rubber in said bore, and an electronic tube slidably installed in said sleeve, the inner diameter of said sleeve being normally slightly less than the diameter of said tube.

5. Apparatus in accordance with claim 4 wherein the outer periphery of said sleeve is fluted lengthwise thereof before installation, said sleeve being compressed radially in the final asembly by aid tube and bore so that substantially the entire outer surface of said sleeve is in contact with said bore.

6. An electronic tube mount assembly comprising a generally tubular shaped structure of elastic and heat conductive properties having a bore slightly less in diameter than the tube to be mounted therein, an exterior plane surface on said structure parallel to the bore axis thereof, the width of said plane surface being substantially equal to the maximum outside diameter of said mount at said bore, an electronic tube elastically held within said bore, a rigid heat sink member having a flat portion, and said mount being uniformly bonded along said exterior surface thereof to said flat portion of said member by a suitable adhesive.

References Cited in the file of this patent

UNITED STATES PATENTS

| | | |
|---|---|---|
| 2,529,279 | Breisch | Nov. 7, 1950 |
| 2,578,809 | Ketchum | Dec. 18, 1951 |
| 2,611,064 | Wilson | Sept. 16, 1952 |
| 2,737,579 | Wehrlin et al. | Mar. 6, 1956 |
| 2,799,793 | De Cain | July 16, 1957 |
| 2,899,483 | Robertson et al. | Aug. 11, 1959 |
| 2,904,617 | King | Sept. 15, 1959 |
| 2,963,676 | Sneesby et al. | Dec. 5, 1960 |

FOREIGN PATENTS

| | | |
|---|---|---|
| 659,728 | Great Britain | Oct. 24, 1951 |

OTHER REFERENCES

Publication I: "Protection of Tubes from Shock and Vibration" (Benderly), published in Electronic Equipment, April 1957 (pages 28–30 relied on).

Publication II: "Silicone Rubber for Mechanical Components" (Javitz), published in Electrical Manufacturing, November 1952 (page 146 relied on).

Publication III: "Efficient Heat Removal . . . a Key to Reliability," Electronic Equipment, January 1956 (pages 10–13 relied on).